United States Patent [19]
Vardanega

[11] Patent Number: 5,690,262
[45] Date of Patent: Nov. 25, 1997

[54] PAGER MOUNTING SYSTEM

[76] Inventor: Robert Vardanega, 2923 Marina Dr., Alameda, Calif. 94501

[21] Appl. No.: 660,588

[22] Filed: Jun. 11, 1996

[51] Int. Cl.⁶ ................................................. A44B 21/00
[52] U.S. Cl. ......................... 224/667; 24/3.11; 224/670; 224/269; 224/930
[58] Field of Search ............................. 224/666, 667, 224/669, 670, 247, 269, 930; 24/3.11, 3.12

[56] References Cited

U.S. PATENT DOCUMENTS

| | | | |
|---|---|---|---|
| 125,921 | 4/1872 | Will et al. | 224/667 X |
| 3,777,953 | 12/1973 | Lewis . | |
| 3,808,642 | 5/1974 | Nation | 24/3.11 X |
| 3,907,182 | 9/1975 | Bryant | 224/670 |
| 4,837,559 | 6/1989 | Green, Sr. . | |
| 4,858,798 | 8/1989 | Siddoway et al. . | |
| 5,075,931 | 12/1991 | van Kuijk . | |
| 5,261,583 | 11/1993 | Long et al. . | |
| 5,274,318 | 12/1993 | Nordeberg et al. . | |
| 5,319,349 | 6/1994 | Smith, III . | |
| 5,375,749 | 12/1994 | Oliva . | |
| 5,528,770 | 6/1996 | Castilla et al. | 224/667 X |

Primary Examiner—Renee S. Luebke
Attorney, Agent, or Firm—David G. Beck; Townsend and Townsend and Crew LLP

[57] ABSTRACT

A system is provided for securely attaching a portable device to the clothing or other personal item of a user. The system utilizes a modified retaining clip, the retaining clip being pivotably mounted to the device housing. As modified, the retaining clip may be locked in a closed position, thus preventing the portable device from being easily dislodged from the selected personal article. In one embodiment, an adjustable separator is interposed between one end of the mounting clip and the device housing. By controlling the amount that the first end of the clip can be depressed, the separator also controls the size of the gap between the second end of the clip and the device housing. In a second embodiment, the modified retaining clip includes a pair of flexible projections proximate one end of the clip as well as a compression mechanism. The compression mechanism controls the gap between the two flexible projections, thus controlling the relative flexibility of the projections. When the compression mechanism is in a first position, the gap between the flexible projections is relatively unrestrained, allowing the retaining clip to be adjusted. In this position the user is able to attach or release the portable device to or from the selected article of clothing. When the compression mechanism is placed in a second or locked position, the projections are relatively rigid, thereby preventing the retaining clip from moving.

10 Claims, 7 Drawing Sheets

PAGER MOUNTING SYSTEM

The present invention relates generally to portable device mounting systems and, more particularly, to a system for securely attaching a portable device to a user.

BACKGROUND OF THE INVENTION

Many portable devices are designed to be carried about by the user during normal use. Examples of such devices include pagers, telephones, radios, tape players, and CD players. In order to provide the user with hands-free operation of the device, frequently such devices include some form of mounting system which allows the user to clip the device onto an article of clothing (e.g., belt, pocket, etc.) or other personal accessory (e.g., briefcase, purse strap, etc.). Unfortunately such devices are often lost since the mounting systems typically rely on spring clips which may release upon sufficient force, such as that which accompanies many forms of exercise. Various mounting systems have been proposed to eliminate such accidental loss.

U.S. Pat. No. 5,319,349 discloses the use of an adjustable auxiliary spring which is to be used in combination with the original spring which is associated with a pager clip member. The force of the auxiliary spring supplements that of the original spring, thus ensuring that sufficient spring tension is maintained even as the original spring weakens due to age. Pat. No. 5,319,349 also discloses the use of a detector circuit which emits a perceptible signal when the clip member is pivoted away from the device housing.

U.S. Pat. No. 5,075,931 discloses the use of an L-shaped clip member with a portable device. The hinge, which attaches the clip to the device housing, is fitted at a distance from one leg of the L-shaped member with the hinge axis running essentially parallel to this axis. The position and shape of the clip member allows a user to clip the device onto a clothing article in a variety of orientations.

U.S. Pat. No. 4,858,798 discloses a soft carrying case for use with portable hand-held devices. The disclosed carrying case includes a flexible belt flap which can be used to mount the case to the belt of a user. The top of the belt flap is permanently attached to the carrying case while the lower end of the flap is releasably attached using snap fittings.

From the foregoing, it is apparent that a secure mounting system for portable devices is desired.

SUMMARY OF THE INVENTION

The present invention provides a system for securely attaching a portable device to the clothing of the user. This mounting system prevents the accidental removal of the portable device.

Pagers and other portable devices typically provide a spring retaining clip which can be used to attach the device to the clothing or some other personal article of the user. The retaining clip permits hands-free carrying of the device, thus allowing the user greater freedom of movement. The typical spring clip is attached to the housing of the portable device at a hinge point. The user presses a first end of the clip towards the body of the device which creates a gap between the second end of the clip and the device. After the user places an article of clothing, such as a belt, between the clip and the device, the user removes pressure from the first end of the clip. A spring forces the first end of the clip away from the device housing, thus forcing the second end of the clip towards the device housing, thereby entrapping the article of clothing. The present invention provides a locking mechanism which prevents the accidental removal of the device by locking the retaining clip into place.

The present invention utilizes a locking member attached to the retaining clip. The end of the locking member closest to the section the user depresses to pivot the retaining clip contains two flexible structures, the ends of the flexible structures resting on the portable device housing. A pin spans the gap between the two flexible structures, projecting past the outer surface of each flexible structure. An end cap is attached to one end of the pin and a compressible mechanism is attached to the other end of the pin.

When the compressible mechanism is placed in a first position, the gap between the flexible structures is relatively unrestrained. In this configuration when a user depresses a portion of the retaining clip by depressing on a similarly positioned portion of the locking member, the gap between the flexible structures expands, thus permitting a gap to be created between a second portion of the retaining clip and the portable device. An article of clothing or other personal article can then be placed within the gap.

When the compressible mechanism is placed in a second position, the position of the end cap and the compression mechanism prevent the gap between the flexible structures from expanding. Thus in this position the flexible structures become inflexible and the retaining clip is locked into place thereby preventing any gap from being created between the second portion of the retaining clip and the portable device.

A further understanding of the nature and advantages of the present invention may be realized by reference to the remaining portions of the specification and the drawings.

DESCRIPTION OF THE PREFERRED EMBODIMENT

Figure 1:
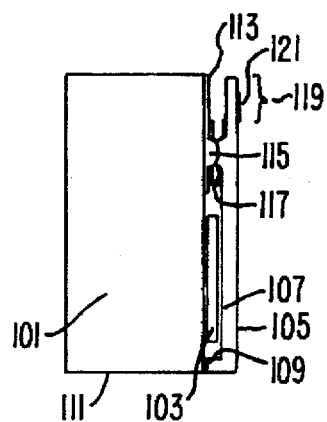
FIG. 1 is an illustration of a pager mounting clip according to the prior art.

FIG. 1 is an illustration of a pager mounting clip according to the prior art. A pager 101 is held to an article of clothing 103, such as a belt, with a clip 105. Clip 105 has a L-shape, thus allowing sufficient space for clothing article 103 to fit between the body of pager 101 and an inside surface 107 of clip 105. An inwardly turned portion 109 of clip 105 helps to prevent the unintentional removal of the pager. Unintentional removal may result due to jolting motions, such as those which occur during jogging and other forms of exercise, as well as pressure exerted on a bottom surface 111 of pager 101.

Clip 105 is connected to a mounting bracket 113, pivoting about a hinge axis 115. Mounting bracket 113 and the housing of pager 101 may be formed from a single piece of material or bracket 113 may be separately formed and subsequently attached to pager 101. If bracket 113 is separate from the pager body, it may be attached using adhesives, bolts, or any of a variety of known techniques.

Located between clip 105 and pager 101 is a spring 117. Spring 117 may be a simple U-shaped piece of spring metal, as shown, or it may be a coil spring. Spring 117 applies a separating force between clip 105 and pager 101 at area 119, resulting in inwardly turned portion 109 of clip 105 being forced toward pager 101. This force, in turn, captures clothing article 103 in the open area between clip 105 and pager 101.

In operation, a user applies a force at a site 121, thereby compressing spring 117. As spring 117 is compressed, end portion 109 of clip 105 is separated from pager 101. The more force which the user applies to site 121, the greater the separation distance. Once a sufficient separation is formed, the user slips the pager device onto the selected article of clothing 103 and releases the pressure from site 121. The release of pressure captures clothing article 103 between clip 105 and pager 101, thus securing pager 101 to article of clothing 103. Removal of pager 101 is either through reapplication of force to site 121, or through an accidental application of force as previously described. Accidental removal of pager 101 becomes easier with age due to the gradual deterioration of spring 117.

Figure 2:
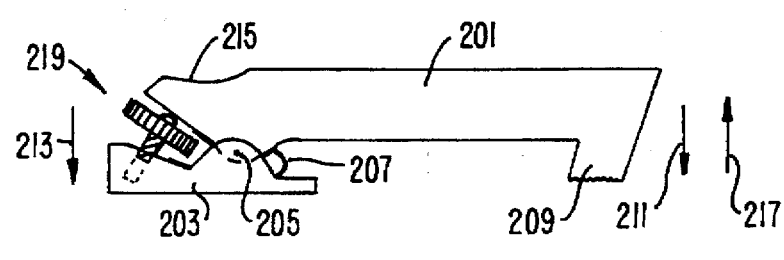
FIG. 2 is an illustration of a portable device mounting clip according to the invention.

FIG. 2 is an illustration of one embodiment of a mounting clip 201 according to the invention. Clip 201 is suitable for holding a pager or other portable device to an article of clothing. Clip 201 is coupled to a mounting bracket 203 at a hinge axis 205. Mounting bracket 203 and the housing of the portable device (not shown) may be constructed of a single piece of material or mounting bracket 203 may be separately formed and subsequently attached to the device housing. A spring 207, interposed between clip 201 and mounting bracket 203, forces a tip portion 209 of clip 201 in a direction 211. Thus tip portion 209 is forced by spring 207 towards the body of the pager or other portable device (not shown). Spring 207 is preferably a piece of spring metal which, when compressed, is placed in a U-shaped form.

To open clip 201, thus allowing the portable device to be placed over an article of clothing, the user presses in a direction 213 on a portion 215 of clip 201. This pressure causes further compression of spring 207, thereby moving tip portion 209 in a direction 217. Portion 215 may have a slight depression contoured to fit a user's thumb. The surface of portion 215 may also be roughened to provide the user with a slip resistant surface.

Figure 3:
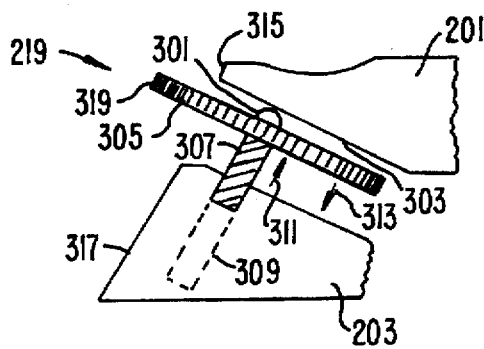
FIG. 3 is an illustration of a locking mechanism in a fully locked position.
Figure 4:
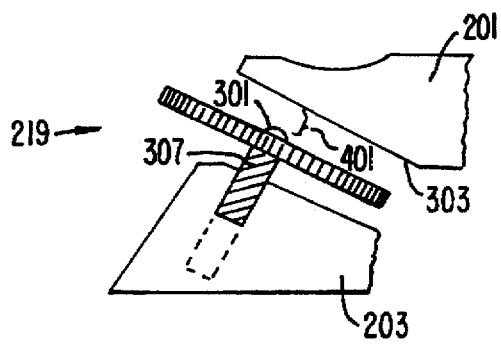
FIG. 4 is an illustration of the locking mechanism of FIG. 3 in a partially withdrawn position.
Figure 5:
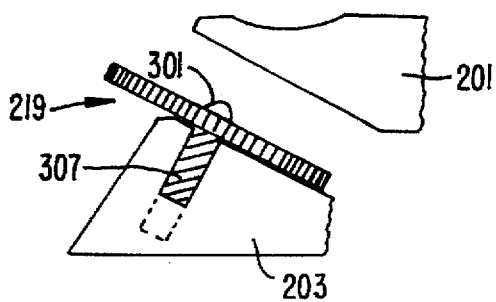
FIG. 5 is an illustration of the locking mechanism of FIG. 3 in a completely withdrawn position.

Interposed between clip 201 and mounting bracket 203 is a locking mechanism 219 according to one embodiment of the invention. FIGS. 3-5 illustrate locking mechanism 219 in further detail. FIG. 3 is an illustration of locking mechanism 219 in the fully locked position. In this position a small protuberance 301 rests against a lower surface 303 of clip 201, preventing clip 201 from being depressed. Furthermore, since protuberance 301 prevents the downward motion of this portion of clip 201, portion 209 cannot be moved in a direction 217 without bending or breaking clip 201, thus preventing accidental removal of the portable device.

Locking mechanism 219 is comprised of protuberance 301, a thumbwheel 305, and a threaded stud 307. Threaded stud 307 is threadably engaged with a threaded hole 309. Therefore as thumbwheel 305 is rotated, stud 307 either moves in a direction 311 or a direction 313, depending upon the direction of rotation. Preferably a portion of thumbwheel 305 extends beyond a surface 315 of clip 201 and beyond a surface 317 of mounting bracket 203 thus providing easy access to a user. An edge 319 of thumbwheel 305 may be roughened or serrated to provide a slip resistant surface.

FIG. 4 is an illustration of locking mechanism 219 partially withdrawn. In this figure stud 307 has been further screwed into hole 309, thus providing a slight separation 401 between protuberance 301 and surface 303. In this location locking mechanism 219 no longer prevents the movement of clip 201. FIG. 5 is an illustration of locking mechanism 219 completely withdrawn from the locking position shown in FIG. 3. In this configuration clip 201 can be completely opened.

Figure 6:
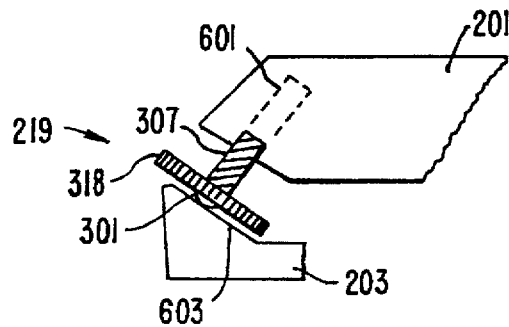
FIG. 6 is an illustration of another embodiment of the locking mechanism.
Figure 7:
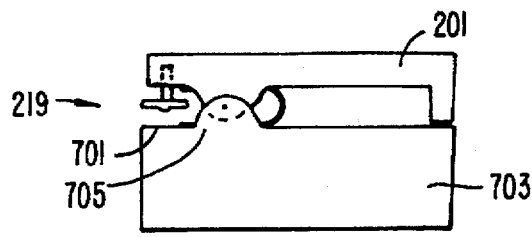
FIG. 7 is an illustration of an alternate configuration of the locking mechanism shown in FIG. 6.

FIG. 6 is an illustration of an alternate embodiment of locking mechanism 219. In this embodiment stud 307 is threadably engaged in a hole 601 of clip 201. In the locked position, protuberance 301 rests against a surface 603 of mounting bracket 203. This embodiment functions in an identical fashion to that illustrated in FIGS. 3-5. The angle of stud 307 with respect to clip 201 and bracket 203 is not critical. For example, FIG. 7 is an illustration of an embodiment of the invention similar to that shown in FIG. 6. However, in FIG. 7 locking mechanism 219 moves in and out of clip 201 at an angle perpendicular to a surface 701 of device 703. In this embodiment clip 701 is mounted directly to device housing 703 via a pair of clip hinge plates 705 integral to housing 703.

Figure 8:
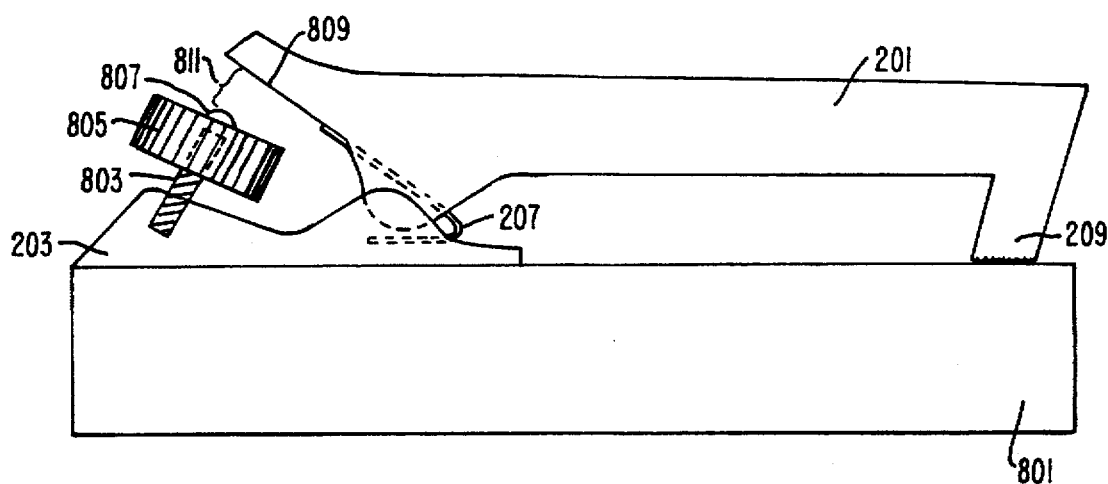
FIG. 8 is an illustration of another embodiment of the locking mechanism according to the present invention.

FIG. 8 is an illustration of an alternate embodiment of a locking mechanism according to the present invention. As in the previous embodiments, mounting bracket 203 is fixed to a pager or other portable device 801, either by forming bracket 203 and device housing 801 from a single piece of material or by attaching a separate bracket 203 to housing 801. This embodiment also has clip 201 and spring 207.

Fixably attached to bracket 203 is a threaded stud 803. Stud 803 is attached to bracket 203 using adhesives, welding techniques, or any of a variety of well known methods. Thumbwheel 805 is threadably engaged to stud 803. Extending from an upper surface of thumbwheel 805 is a protuberance 807. The main purpose of protuberance 807 is to provide a raised surface to press against surface 809 of clip 201 when the locking mechanism is in the locked position, thus insuring smooth operation of the locking mechanism. The location and dimensions of protuberance 807 are not critical.

Rotation of thumbwheel 805 results in either the narrowing or the widening of gap 811, depending upon the direction of rotation. The size of gap 811 governs the degree to which portion 209 of clip 201 can be separated from device housing 801. When protuberance 807 is in contact with surface 809, clip 201 is in the locked position. If desired, stud 807 can be fixed to clip 201, thus causing protuberance 807 to be in contact with mounting bracket 203 when clip 201 is in the locked position.

Figure 9:
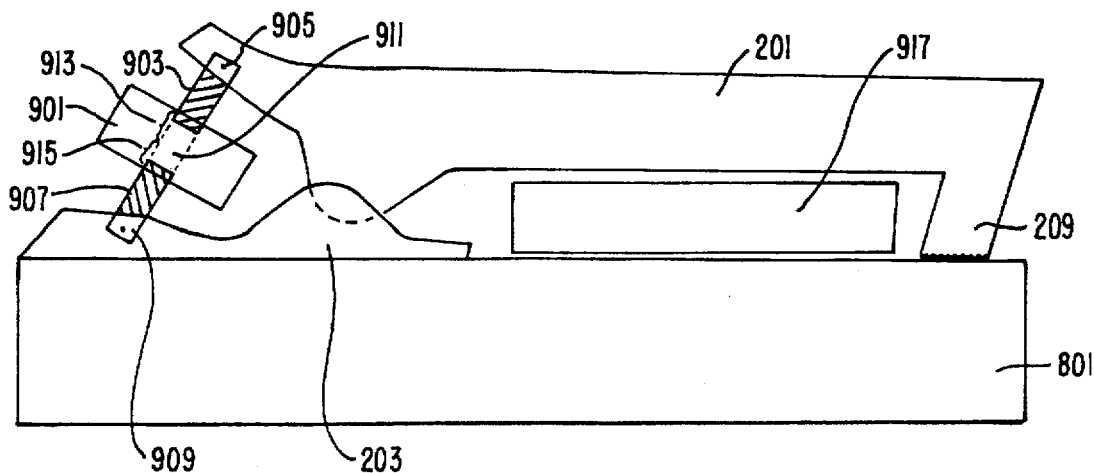
FIG. 9 is an illustration of an embodiment of the invention which does not require the use of a clip spring.
Figure 10:
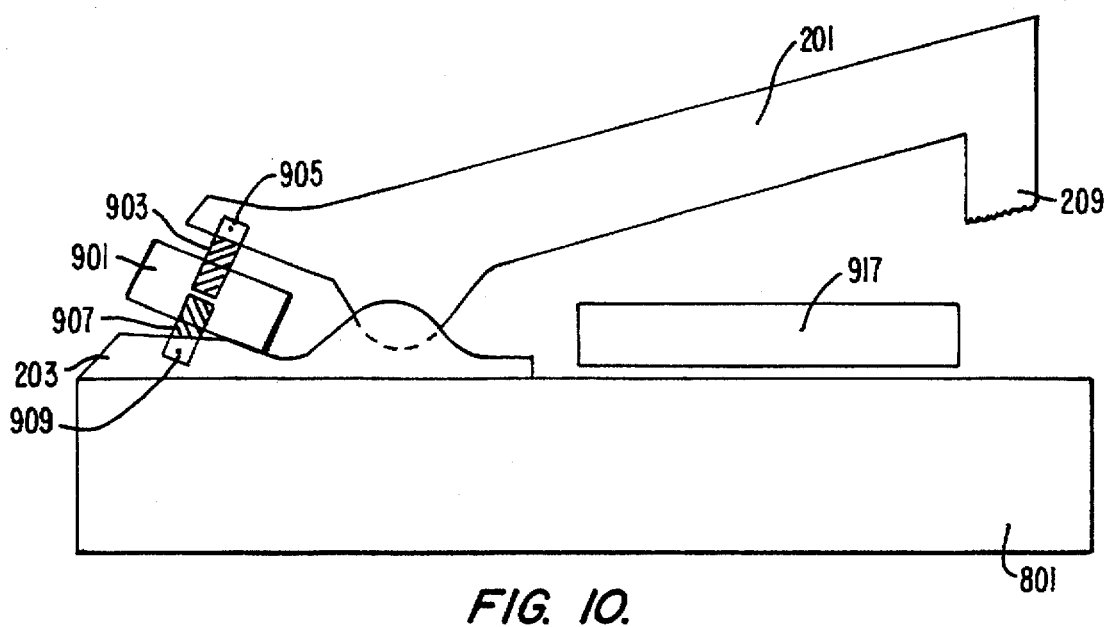
FIG. 10 is an illustration of the embodiment of the invention shown in FIG. 9 with the clip member in an open position.

FIGS. 9 and 10 illustrate an embodiment of the invention which does not require the use of a clip spring. In this embodiment thumbwheel 901 controls the separation distance between portion 209 of clip 201 and device housing 801. A threaded stud 903 is attached to clip 201 with a pin 905. Similarly, a threaded stud 907 is attached to mounting bracket 203 with a pin 209. Pins 905 and 909 allow sufficient movement of studs 903 and 907, respectively, to prevent binding as thumbwheel 901 is rotated. Studs 903 and 907 have opposing threads, i.e., one stud has left hand threads and the other stud has right hand threads. Extending through thumbwheel 901 is a threaded hole 911. A portion 913 of hole 911 is threaded to match the threading of stud 903 and a second portion 915 is threaded to match the threading of stud 907.

In operation, a user rotates thumbwheel 901 in a direction which forces the ends of studs 903 and 907 towards the center of hole 911, thus causing portion 209 of clip 201 to separate from housing 801 as illustrated in FIG. 10. Thumbwheel 901 can be rotated in this direction until the ends of studs 903 and 907 meet. At this point an article of clothing 917 (e.g., a belt) can be placed between clip 201 and device housing 801. The user then rotates thumbwheel 901 in the opposite direction, forcing the ends of studs 903 and 907 away from the center of hole 911. This action causes clip 201 to clamp down on article 917, locking article 917 in place.

Figure 11:
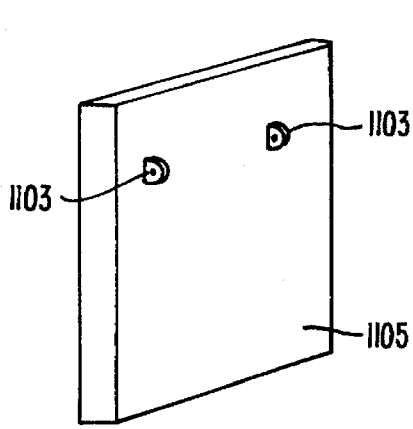
FIG. 11 illustrates a mounting bracket applicable to a variety of portable devices.
Figure 12:
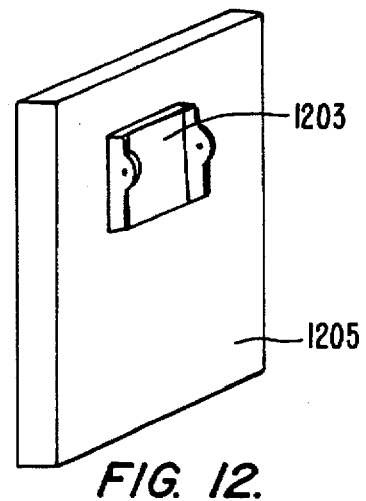
FIG. 12 illustrates an alternate mounting bracket applicable to a variety of portable devices.
Figure 13:
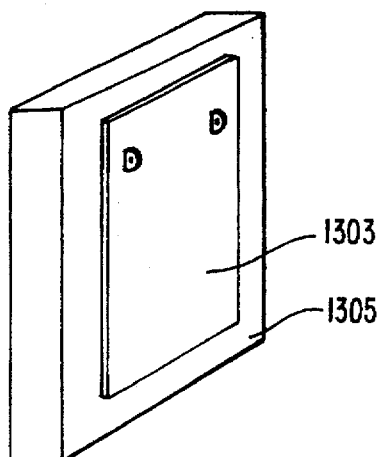
FIG. 13 illustrates an alternate mounting bracket applicable to a variety of portable devices.

FIGS. 11–13 illustrate several different mounting brackets 203, showing the applicability of the present invention to a variety of portable devices. These figures are intended only to show some of the possible mounting configurations, not to indicate any limitations inherent in the invention.

In FIG. 11 a pair of hinge members 1103 are formed as part of a device housing structure 1105. In FIG. 12 a bracket 1203 is separately formed from device housing 1205. Similarly, bracket 1303 illustrated in FIG. 13 is separately formed from device housing 1305. The principal difference between these two configurations is in the size of the respective brackets 1203 and 1303. Bracket 1303, due to its size, can be used to add strength to housing 1305. Brackets 1203 and 1303 can be attached using a variety of techniques including bonding, welding, screw attachments, or any other well known method of attachment.

Figure 14:
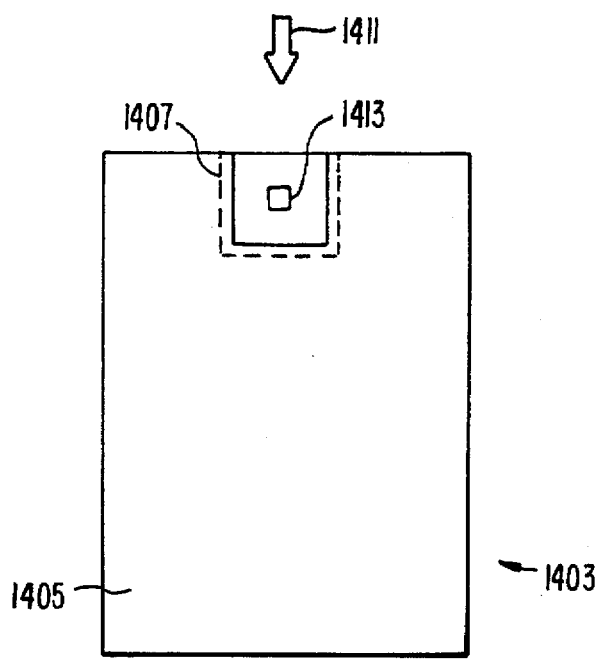
FIGS. 14–17 illustrate a releasable technique of attaching a mounting bracket to a device housing.
Figure 15:
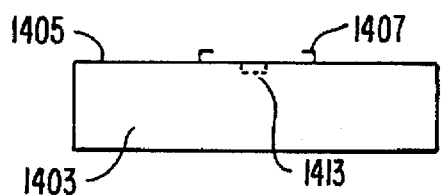
Figure 16:
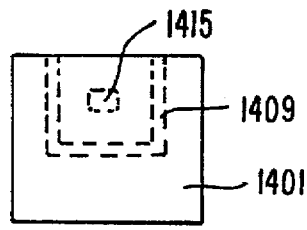
Figure 17:

FIGS. 14–17 illustrate a releasable technique of attaching a bracket 1401 to a device housing 1403. FIG. 14 is a top view of a surface 1405 of device housing 1403. Formed on surface 1403 is a structure 1407. As illustrated in the cross-sectional view shown in FIG. 15, structure 1407 has an L-shaped form along three sides and is open on the fourth side. FIGS. 16–17 illustrate bracket 1401 and a structure 1409 which is complementary to structure 1407. FIG. 17 is an illustration of the cross-sectional view of bracket 1401. Structure 1409 is designed to slide into structure 1407 in the direction given by 1411.

Surface 1405 contains one or more indentations 1413. Bracket 1401 contains one or more protuberances 1415 which align with indentations 1413 when bracket 1401 is properly aligned, thus locking bracket 1401 to housing 1403. Preferably protuberance 1415 can be temporarily lifted out of indentation 1413 to allow the user to decouple bracket 1401 from housing 1403.

In another embodiment of the locking mechanism a pivotable brace is attached to a first end of a clip member, the pivotable brace having a locked position and an unlocked position. In the unlocked position the brace remains out of the way, thus allowing the first end of the clip member to be depressed and the second end of the clip member to be separated from the portable device housing. After the user has placed an article of clothing between the clip member and the device housing, the brace is pivoted into the locked position. In this position the end of the brace is pressed into a notch in the device housing, thereby preventing the depression of the first end of the clip member.

In another embodiment a stopper is placed between the first end of the clip member and the device housing when the user wishes to lock the clip member into the closed position. The stopper may be made of a compressible material, such as rubber, and may include an adjustable internal plunger member which can be used to vary the outer diameter of the stopper. The clip member and the device housing may be configured to conform to the outer diameter of the stopper, thus insuring a tight fit. The stopper is preferably connected with a cable to the clip member and/or the device housing to prevent loss.

Figure 18:
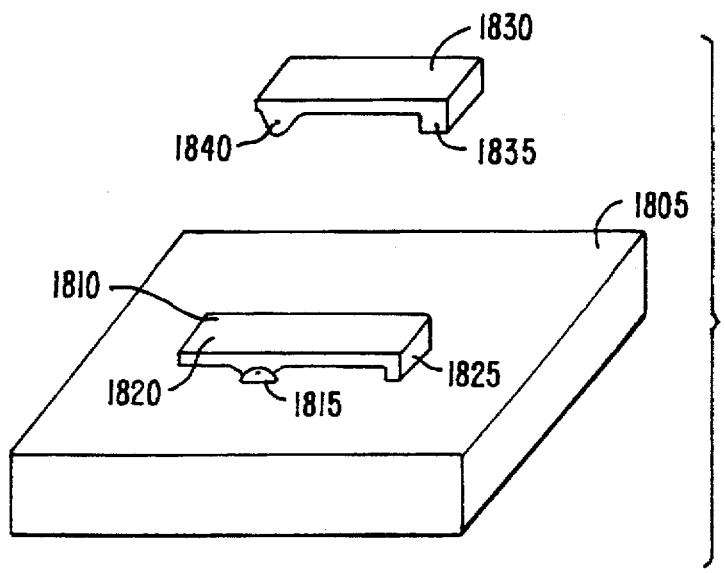
FIG. 18 is an illustration of an alternate embodiment of the invention utilizing a flexible locking member.

FIG. 18 is an illustration of an alternate embodiment of the invention which includes a portable device 1805 and a retaining clip 1810. Device 1805 can be any portable device such as a pager, telephone, personal radio, or personal CD player. Retaining clip 1810 may be mounted directly to device 1805 or to a mounting plate such as those previously illustrated in FIGS. 11–17. Lip 1810 pivots about a hinge point 1815. When a user presses on a portion 1820 of clip 1810, an end section 1825 is separated from device 1805 allowing the user to clip device 1805 onto an item of interest, for example an article of clothing (not shown). Typically a spring forces section 1825 against when portion 1820 is not being pressed, thus preventing the accidental release of the item of interest.

In this embodiment of the invention, a locking member 1830 is attached to clip 1810 using a conventional attachment technique such as screws or adhesives. In the preferred embodiment, locking member 1830 is designed to wrap around clip 1810, thus eliminating the need for screws, adhesives, etc. and making member 1830 easily transferable to other portable devices. Locking member 1830 has an end section 1835 which wraps around clip end section 1825. Locking member 1830 also has two flexible portions 1840. In the preferred embodiment flexible portions 1840 are formed of rubber or a synthetic material with similar flexing characteristics to that of rubber.

Figure 19:
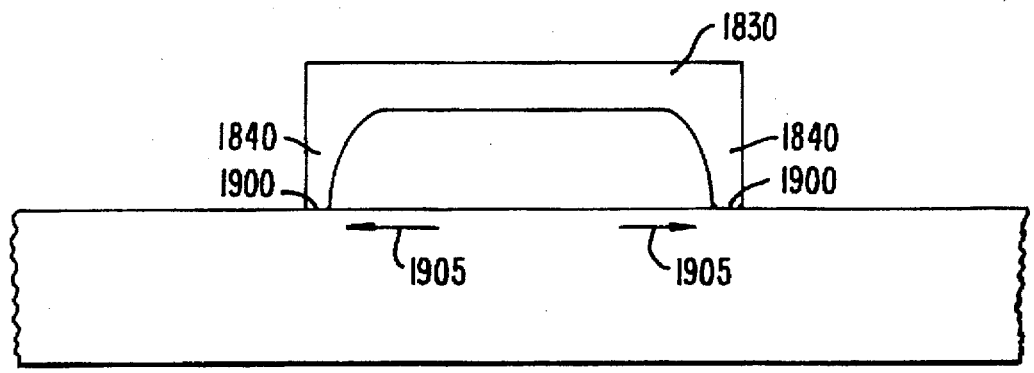
FIG. 19 is a cross-sectional view of a flexible locking member according to the invention.

FIG. 19 presents a cross-sectional view of locking member 1830. When clip 1810 (not shown) is in its normal position and is pressing against portable device housing 1805, tips 1900 of flexible potations 1840 are approximately in contact with portable device 1805. If portion 1820 of clip 1810 is pressed, tips 1900 of flexible portions 1840 move outward in directions 1905 thus allowing clip portion 1825 to be separated from portable device 1805.

Figure 20:
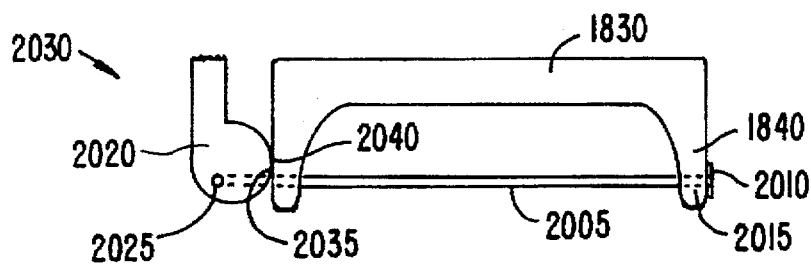
FIG. 20 is an illustration of the preferred compression mechanism for use with the embodiment illustrated in FIG. 18.

FIG. 20 is an illustration of the preferred locking mechanism for use with this embodiment. A pin 2005 spans the gap between the two flexible portions 1840, intersecting each flexible portion 1840. At one end of pin 2005 is an end cap 2010 which prevents pin 2005 from sliding through the flexible portion 1840. End cap 2010 can be threadably attached to pin 2005, bonded to pin 2005, or some other technique of joining the two pieces can be used. In an alternate embodiment, the end of pin 2005 can be threadably attached or bonded directly to flexible portion 1840 at site 2015.

A compression mechanism 2020 is fitted to the end of pin 2005 opposite cap 2010. Preferably mechanism 2020 is pivotably attached to pin 2005, the pivot point 2025 being substantially off-center. When mechanism 2020 is in a position 2030 as shown in FIG. 20, an edge 2035 of mechanism 2020 is placed substantially in contact with an edge 2040 of flexible portion 1840. This position prevents the gap separating the two flexible portions 1840 from substantially expanding, thus preventing clip portion 1820 being depressed and clip end section 1825 from separating from device 1805.

Figure 21:
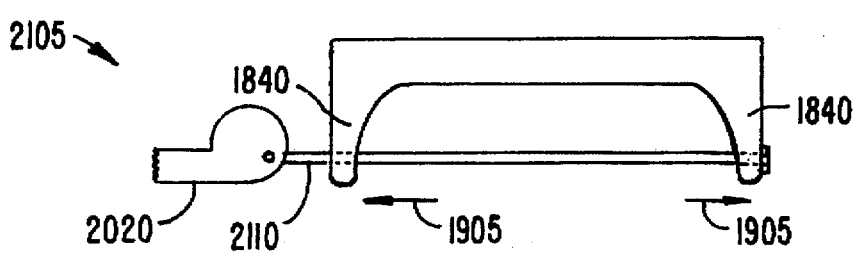
FIG. 21 is an illustration of the compression mechanism in the unlocked position.

FIG. 21 is an illustration of compression mechanism 2020 in a position 2105. Since pivot 2025 coupling mechanism 2020 to pin 2005 is off-center, placing mechanism 2020 in position 2105 creates a gap 2110 between mechanism 2020 and surface 2040 of flexible portion 1840. Gap 2110 is sufficient to allow flexible portions 1840 move in a direction 1905. When mechanism 2020 is in position 2105, a user is able to press on portion 1820 of clip 1810, thus allowing clip end section 1825 to be separated from device 1805.

Figure 22:
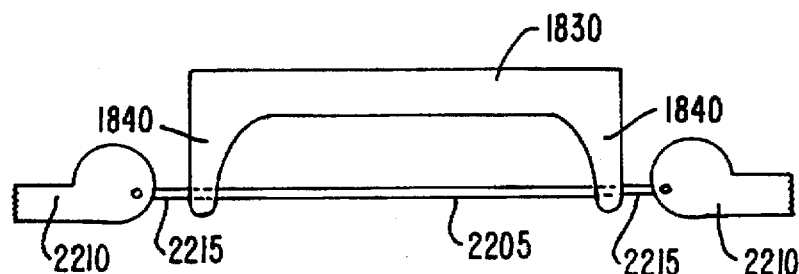
FIG. 22 is an illustration of an alternate embodiment of the compression mechanism for use with the flexible locking member.

FIG. 22 is an alternate embodiment of the invention. In this embodiment each end of pin 2205 has a locking mechanism 2210. When mechanisms 2210 are in the unlocked position, as shown, two gaps 2215 are formed. Thus this embodiment provides additional freedom of movement for flexible portions 1840.

Figure 23:
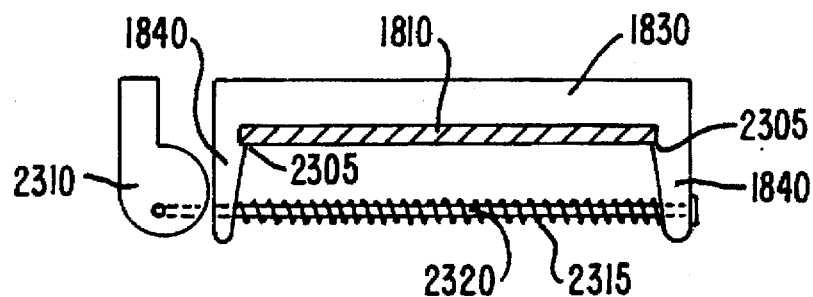
FIG. 23 is an illustration of an embodiment of the invention in which the locking member captures a portion of the retaining clip when the locking member is placed in the locked position.

FIG. 23 is an illustration of an alternate embodiment of the invention. In this embodiment each flexible portion 1840 of locking member 1830 contains a notch 2305. Notches 2305 are of sufficient size to capture a small section of retaining clip 1810 when locking mechanism 2310 is in the locked position as illustrated in FIG. 23. Therefore in this configuration locking member 1830 prevents separation of retaining clip 1810 and device 1805 using two different techniques; first, by preventing the widening of the gap between the two flexible portions 1840 and second, by capturing a section of clip 1810.

Figure 24:
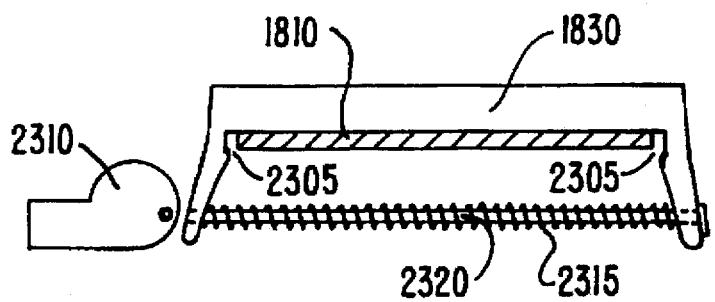
FIG. 24 is an illustration of the embodiment shown in FIG. 23, illustrating the locking member in the unlocked position.

FIG. 24 is an illustration of the embodiment shown in FIG. 23 with locking mechanism 2310 in the unlocked position. A spring 2315 coiled around pin 2320 promotes the widening of the gap between the two flexible portions 1840 when locking mechanism 2310 is released as shown.

Figure 25:
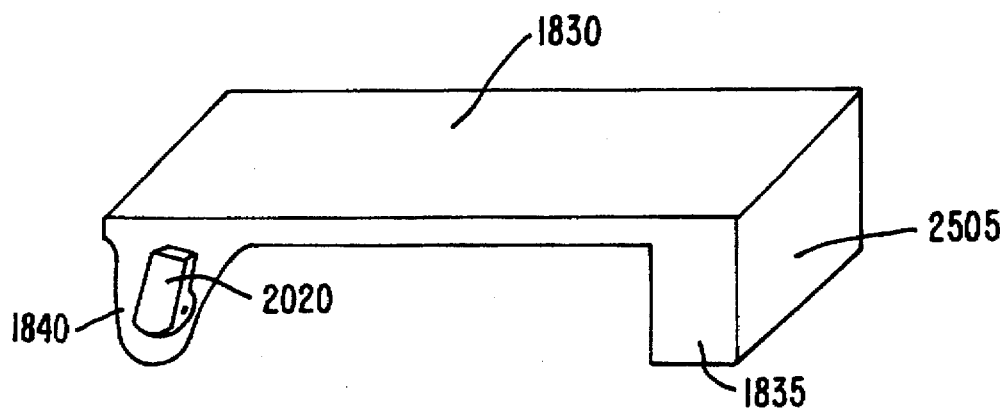
FIG. 25 is an orthogonal projection of a locking member.

FIG. 25 is an orthogonal projection of locking member 1830, including end portion 1835, flexible portion 1840, and compression mechanism 2020.

Figure 26:
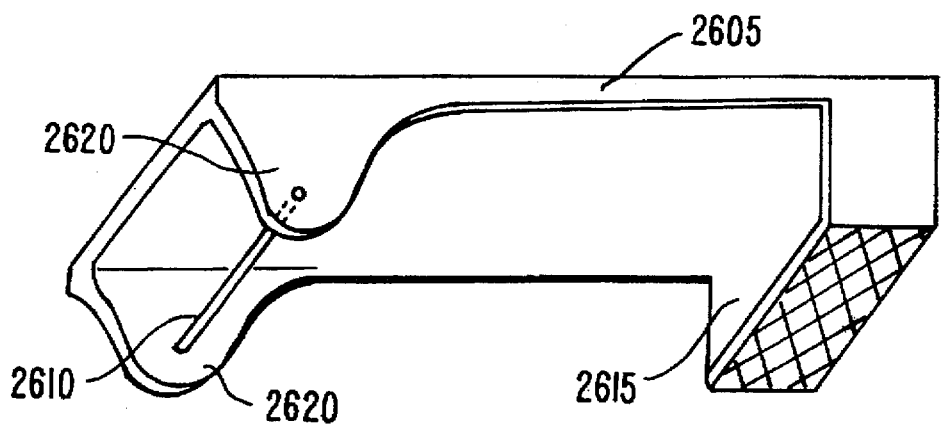
FIG. 26 is an orthogonal projection of a locking member showing the underside of the member.

FIG. 26 is an orthogonal projection of a locking member 2605 showing the underside of the member. To install member 2605 onto a portable device retaining clip, a pin 2610 would be removed. This would allow the user to place member 2605 over the retaining clip (not shown). Portion 1825 of the retaining clip would fit into portion 2615 of member 2605. The end section of member 2605 (see end section 2505 of FIG. 25) is preferably solid, thereby preventing member 2605 from being dislodged from the retaining clip. After member 2605 has been installed, pin 2610 is reinserted through flexible portions 2620.

Figure 27:
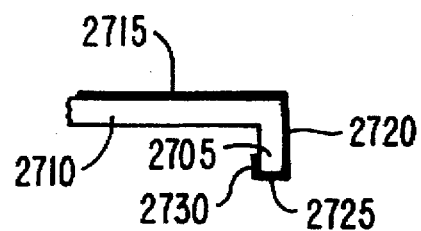
FIG. 27 is a cross-sectional view of a retaining clip end section with a locking member in place.

FIG. 27 is an illustration of a cross-section of an end section 2705 of a retaining clip 2710 with a locking member 2715 in place. In this embodiment member 2715 is designed to fit snugly around end section 2705, encasing the front with a portion 2720, the bottom with a portion 2725, and a section of the back of the clip with a portion 2730.

Figure 28:
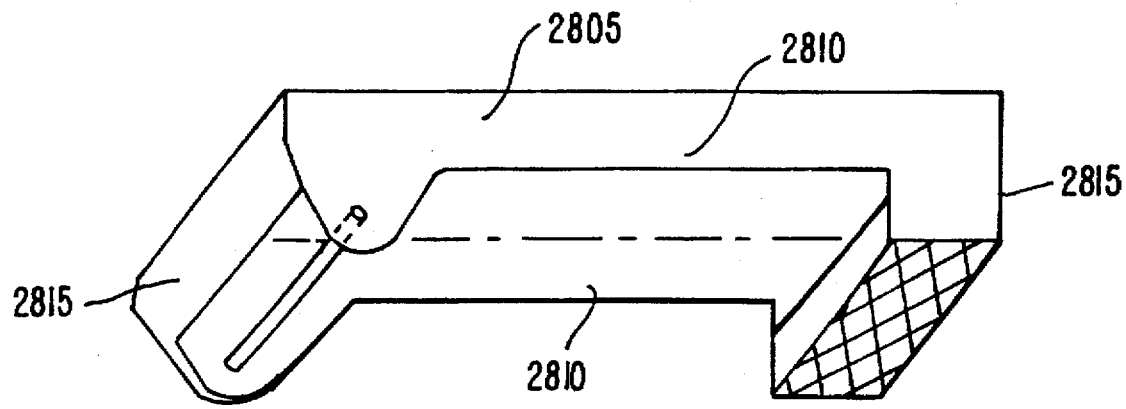
FIG. 28 is an orthogonal projection of a locking member designed to securely fit around a retaining clip.

FIG. 28 is an orthogonal projection of a locking member 2805 similar to that illustrated in FIG. 26. In this configuration, however, the member has a deep recess intended to securely wrap around the retaining clip (not shown). Thus side portions 2810 prevent the side-to-side movement of the retaining clip while end portions 2815 prevent the front-to-back movement of the retaining clip.

As will be understood by those familiar with the art, the present invention may be embodied in other specific forms without departing from the spirit or essential characteristics thereof. For example, the locking mechanism can be a simple cap, threadably coupled to a pin spanning the gap between the two flexible portions of the locking member. Accordingly, disclosure of the preferred embodiment of the invention is intended to be illustrative, but not limiting, of the scope of the invention which is set forth in the following claims.

I claim:

1. A portable device securing system, comprising:
   a portable device housing integral to a portable device;
   a clip member having a first portion and a second portion, said clip member pivotably coupled to said device housing, said pivotal coupling allowing a separation between said second portion of said clip member and said device housing to be varied;
   a locking member attached to said clip member, said locking member having a first and a second flexible portion, said first and second flexible portions separated by a gap, wherein said first and second flexible portions are interposed between said first portion of said clip member and said device housing; and
   a compression member having at least a first position and a second position, wherein said compression member in said first position places said first and second flexible portions in a first position which substantially prevents said second portion of said clip member from being separated from said device housing, and wherein said compression member in said second position places said first and second flexible portions in a second position which allows said second portion of said clip member to separate from said device housing.

2. The portable device securing system of claim 1, further comprised of a tensioning spring interposed between said device housing and said clip member, said tensioning spring applying a force to said clip member to compel said second portion of said clip member to remain in contact with said device housing, and wherein an external force applied to said first portion of said clip member forces said second portion of said clip member to separate from said device housing.

3. The portable device securing system of claim 1, wherein placement of said compression member into said first position reduces said gap and prevents expansion of said gap, said gap expansion prevention substantially preventing flexing of said first and second flexible portions.

4. The portable device securing system of claim 1, wherein said first flexible portion has an inner surface containing a first notch and said second flexible portion has an inner surface containing a second notch, wherein a section of said first portion of said clip member rests within said first and second notches when said gap is reduced by placing said compression member into said first position, and wherein resting of said section of said clip member within said first and second notches substantially prevents pivoting of said clip member.

5. The portable device securing system of claim 1, wherein said first and second flexible portions are formed of rubber.

6. The portable device securing system of claim 1, wherein said compression member is comprised of:

a pin with a first end and a second end, said pin penetrating through said first and second flexible portions;

an end cap attached to said first end of said pin; and a compression lever pivotably attached to said second end of said pin, wherein said compression lever has at least a first position and a second position, wherein said compression lever in said first position places said first and second flexible portions in said first position, and wherein said compression lever in said second position places said first and second flexible portions in said second position.

7. The portable device securing system of claim 6, further comprising a coil spring wrapped around said pin and between said first and second flexible portions, said coil spring maximizing said gap between said first and second flexible portions.

8. The portable device securing system of claim 1, wherein said locking member has a first portion which securely wraps around a first section of said second portion of said clip member, and wherein said flexible portions are attached to a second portion of said locking member.

9. The portable device securing system of claim 8, wherein said locking member has a first side portion and a second side portion, said first and second side portions securely positioning said clip member in relation to said locking member.

10. The portable device securing system of claim 1, wherein said compression member is comprised of:

a pin with a first end and a second end, said pin penetrating through said first and second flexible portions;

a first compression lever pivotably attached to said first end of said pin, wherein said first compression lever has at least a first position and a second position, wherein said first compression lever in said first position reduces said gap; and a second compression lever pivotably attached to said second end of said pin, wherein said second compression lever has at least a first position and a second position, wherein said second compression lever in said first position reduces said gap.

* * * * *